United States Patent
Lal

(10) Patent No.: US 12,137,057 B2
(45) Date of Patent: Nov. 5, 2024

(54) METHOD AND SYSTEM FOR ALLOCATING COMPUTATION RESOURCES FOR LATENCY SENSITIVE SERVICES OVER A COMMUNICATION NETWORK

(71) Applicant: Adeia Guides Inc., San Jose, CA (US)

(72) Inventor: Dhananjay Lal, Englewood, CO (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/872,758

(22) Filed: Jul. 25, 2022

(65) Prior Publication Data

US 2024/0031306 A1     Jan. 25, 2024

(51) Int. Cl.
*H04L 47/80* (2022.01)
*H04L 47/78* (2022.01)

(52) U.S. Cl.
CPC .......... *H04L 47/805* (2013.01); *H04L 47/781* (2013.01); *H04L 47/803* (2013.01)

(58) Field of Classification Search
CPC ..... H04L 47/78; H04L 47/781; H04L 47/803; H04L 47/805
See application file for complete search history.

(56) References Cited

U.S. PATENT DOCUMENTS

| | | | |
|---|---|---|---|
| 10,243,860 B2 | 3/2019 | Szilágyi et al. | |
| 2001/0000457 A1* | 4/2001 | Hinderks | H04N 21/2385 370/468 |
| 2008/0189416 A1* | 8/2008 | Yamada | H04L 47/782 709/226 |
| 2015/0006733 A1* | 1/2015 | Khan | H04L 47/808 709/226 |
| 2015/0074677 A1* | 3/2015 | Pream | G06F 9/5016 718/104 |
| 2017/0111440 A1* | 4/2017 | Alonzo | G06F 9/45558 |
| 2017/0353397 A1 | 12/2017 | Che | |
| 2018/0351876 A1* | 12/2018 | Ren | H04L 47/808 |
| 2019/0208007 A1* | 7/2019 | Khalid | H04L 67/1021 |
| 2020/0112872 A1* | 4/2020 | Nimbavikar | H04L 47/805 |

(Continued)

OTHER PUBLICATIONS

Cao et al., "An Overview of Network-Aware Applications for Mobile Multimedia Delivery," IEEE-Proceedings of the 37th Hawaii International Conference on System Sciences, pp. 1-10 (2004).

(Continued)

*Primary Examiner* — Jeong S Park
(74) *Attorney, Agent, or Firm* — Haley Guiliano LLP

(57) ABSTRACT

Systems and methods are provided for allocating computation capability. A network compute orchestrator (NCO) receives a request for service from a requester device. The NCO determines a required compute grade requirement for the service, and a maximum acceptable latency for the service. The NCO accesses a data structure that stores for each of a network arrangement of network devices: a number and type of available compute units, and latency to the requester device. The NCO selects a network device of the network arrangement of network devices that has an available compute unit meeting the required compute grade requirement, and has latency to the requester device that is lower than the maximum acceptable latency for the service. The NCO causes the selected network device of the network arrangement of network devices to perform the requested service for the requester device.

20 Claims, 8 Drawing Sheets

(56) References Cited

U.S. PATENT DOCUMENTS

2020/0228626 A1* 7/2020 Bernat ................ H04L 47/83
2022/0103617 A1* 3/2022 Campbell ............ H04L 67/101

OTHER PUBLICATIONS

Gino Dion, "Game on! How broadband providers can monetize ultra-low latency services for gamers," Nokia https://www.nokia.com/blog/game-on-how-broadband-providers-can-monetize-ultra-low-latency-services-for-gamers/ pp. 1-13 Jun. 23, 2020.

Erfanian, "Optimizing QoE and Latency of Live Video Streaming Using Edge Computing and In-Network Intelligence," 12th ACM Multimedia Systems Conference, pp. 1-6 (2021).

"What is Motion-To-Photon Latency?" http://www.chioka.in/what-is-motion-to-photon-latency/ pp. 1-6, Mar. 18, 2015, access from internet Aug. 15, 2022.

Janakiram, "Load Balancing in Google Compute Engine," https://cloudacademy.com/blog/load-balancing-in-google-compute-engine/ pp. 1-6 (2014).

"Encoding video and audio with Media Services," https://docs.microsoft.com/en-us/azure/media-services/latest/encode-concept/ pp. 1-6, Oct. 3, 2022, access from the internet Oct. 11, 2022.

"Load-balancing options," https://learn.microsoft.com/en-us/azure/architecture/guide/technology-choices/load-balancing-overview/ pp. 1-9 access from the internet Oct. 11, 2022.

"HERD for the Gigabit Era," https://www.broadbandtechreport.com/docsis/article/16449156/herd-for-the-gigabit-era pp. 1-11 access from the internet Aug. 15, 2022.

Patrick McLaughlin, Cabling considerations for CORD networks, https://www.cablinginstall.com/data-center/article/14068510/cabling-considerations-for-cord-networks pp. 1-13, Cabling Installation & Maintenance, Sep. 10, 2019.

"IDEA Seminar at On The Lot," https://www.immersivealliance.org/2019/12/06/idea-seminar-at-on-the-lot/ pp. 1-6 access from the internet Aug. 16, 2022.

Niculescu et al., "Implementation of a Media Aware Network Element for Content Aware Networks," CTRQ 2011: The Fourth International Conference on Commuication Theory, Reliability, and Quality of Service, 78-83 (2011).

Park et al., "QoE-aware Dynamic Service Composition for Immersive Media-oriented Services," https://www.researchgate.net/figure/QoE-aware-dynamic-composition-framework-for-immersive-media-oriented-services_fig2_228930025 pp. 1-6 access from internet Aug. 15, 2022.

Ruan et al., "A Survey on QoE-Oriented VR Video Streaming: Some Research Issues and Challenges," Electronics, 10, 2155:1-21 (2021).

Saxena et al., "Efficient, QoE aware delivery of 360 videos on VR headsets over mobile links," 13th EAI International Conference on Performance Evaluation Methodologies and Tools, pp. 1-8 (2020).

You et al., "Fog Computing as an Enabler for Immersive Media: Service Scenarios and Research Opportunities," IEEE, 7:65797-65810 (2019).

Masdari et al., "An overview of virtual machine placement schemes in cloud computing," Journal of Network and Computer Applications, 66:106-127 (2016).

* cited by examiner

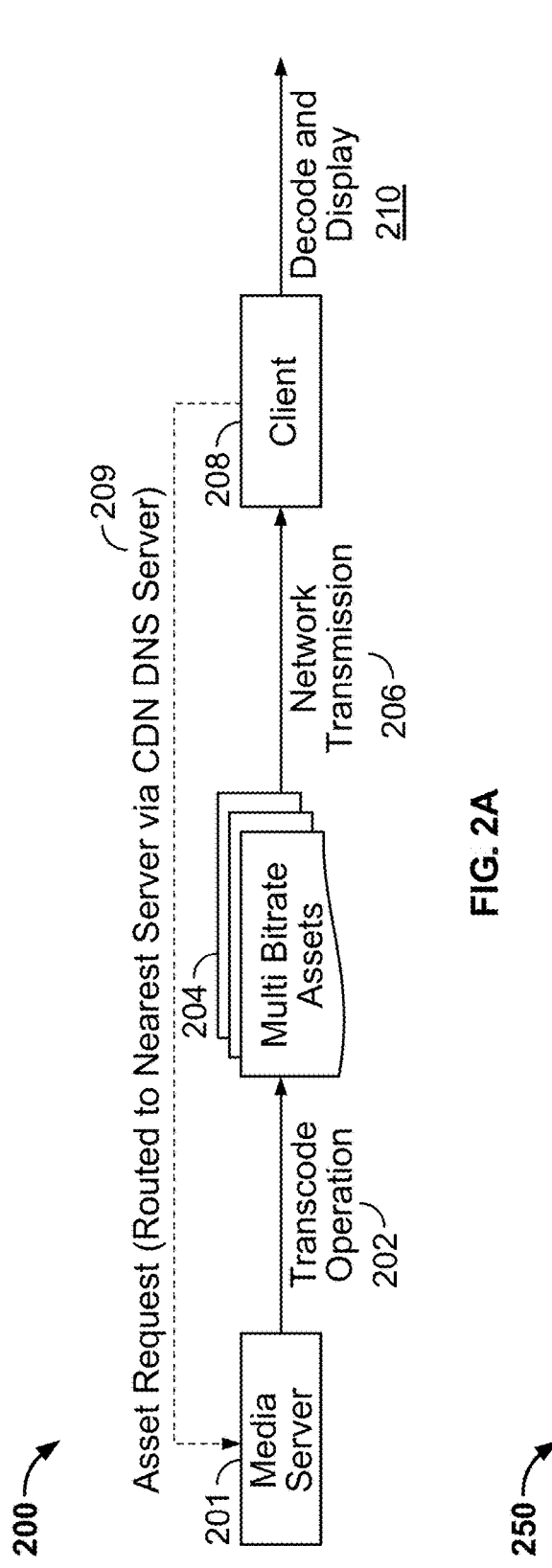
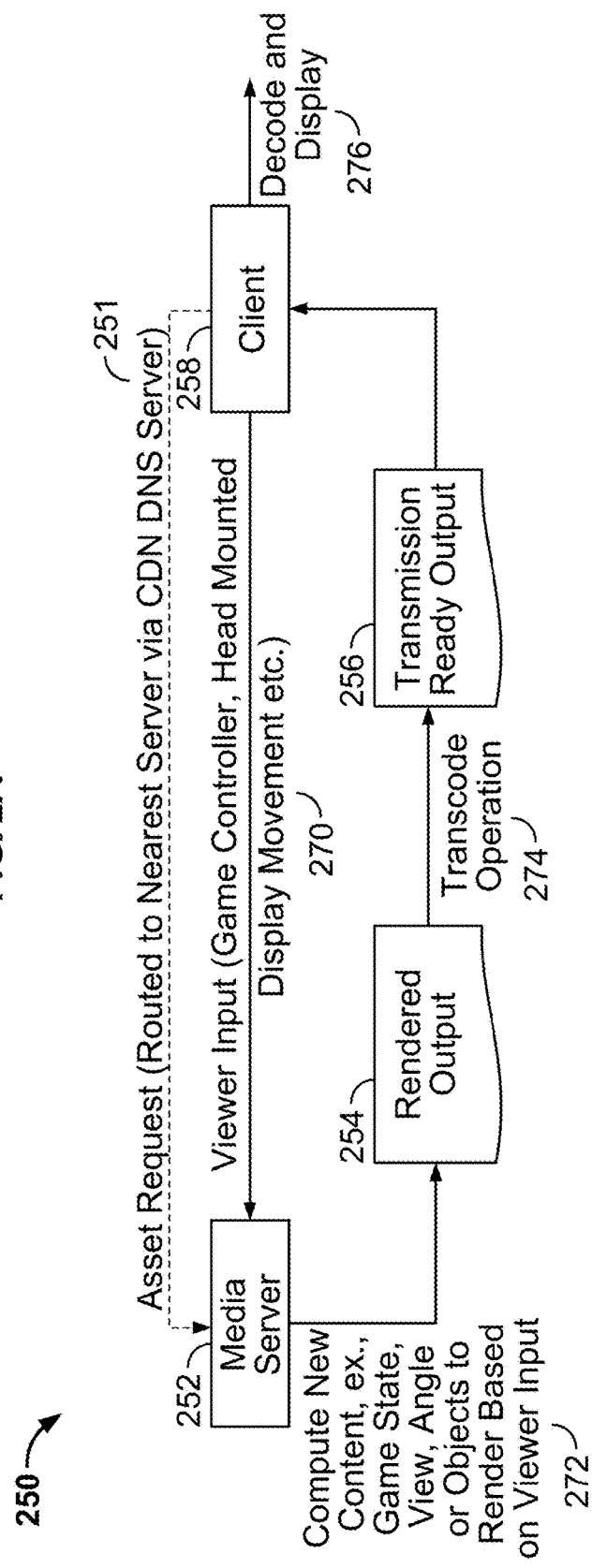
FIG. 2A
FIG. 2B

METHOD AND SYSTEM FOR ALLOCATING COMPUTATION RESOURCES FOR LATENCY SENSITIVE SERVICES OVER A COMMUNICATION NETWORK

BACKGROUND

This disclosure is directed to systems and methods for allocating computation tasks in a networked hierarchy of devices while taking into account a required computation grade and latency requirements of a request.

SUMMARY

Advancements in network transmission technology have enabled expanded use of offloading computation tasks to remote devices (e.g., the cloud) to enable a variety of applications that would be hard or impossible to perform locally. In some approaches, a remote computational service (e.g., cloud device or device) may be provided for computation-heavy tasks requested by user equipment. For example, virtual reality (VR)/augmented reality (AR) (sometimes referred to, collectively and more generally, as Extended Reality (XR)) tasks requested by user equipment (e.g., via movement of a head-mounted device) may be handled by a remote server that generates the newly required graphics and transmits them back to the requester device for display. In another example, a self-driving vehicle may request visual analysis of environmental data captured by its sensors (e.g., to identify hazards). In both of these examples, even a small latency of the service may be important because slow delivery of graphics creates a choppy experience, while late delivery of visual analysis of environmental data may cause an accident for the self-driving vehicle. However, other tasks (e.g., planning a route or opening a browser) may be less computationally intensive and/or less latency sensitive.

In one example approach, the remote server or servers handle all requests for computation services from a client in the same manner. For example, all incoming requests may be allocated to a set of edge servers in first in, first out fashion without regard for computational intensity of the task and/or without regard to latency requirements. As a result, some tasks may fail to be completed at all (e.g., if assigned to an edge server with insufficient capacity for the task) or fail to be completed and delivered in time to be useful (e.g., video data may be delivered too late for AR/VR application to provide a smooth experience).

To help address these problems, with the example approach described above, the disclosed techniques improve overall performance and efficiency of a remote computational service or services (e.g., an edge network system) by more intelligently and efficiently assigning or allocating services or tasks to appropriate network devices. The improved assignment or allocation is enabled by: (i) "triaging," or identifying the minimum performance requirements for, the services or tasks (e.g., based on temporal urgency of the services/tasks, computational requirements of the services/tasks, one or more other factors, or some combination thereof); and/or (ii) evaluating the performance capacity of the potential network devices that might be selected for assignment or allocation of the service(s) in question. The performance capacity may be quantified based on the computational power of the network devices, latency of communications between the network devices and the requestor of the service or task, one or more other factors, or some combination thereof. In an embodiment, a data structure capturing network arrangement (e.g., a hierarchy) of network devices or table of network devices indicating one or more measurements of performance capacity may be identified or constructed. A distinct data structure of a network arrangement (e.g., a hierarchy) may be identified for each requestor device (that is, on a per-requestor basis). The data structure of a network arrangement may be referenced to analyze the performance capacity of the network devices and to assign, for a requested service, a network device having (i) sufficiently low latency to the requesting device to perform the service with sufficiently high quality of service (QoS) or quality of experience (QoE); and/or (ii) sufficiently high computational power to execute the service with sufficiently high QoS or QoE. In any event, in accordance with an embodiment, systems and methods are provided herein that provide a network arrangement of network devices that are assigned to perform service requests while taking into account a compute grade and latency requirements. For example, network devices may be arranged such that lower computational power devices are located relatively close to the requester device (e.g., in a local data center) with low latency, while more computationally powerful devices are located farther (e.g., larger number of network links) upstream on the network (e.g., at regional or national data centers), with higher latency (e.g., as a hierarchy of network devices). However, other configurations of devices (e.g., flat network arrangement with relatively equidistant devices) are also possible.

Such network arrangement of devices may operate or be coordinated with a network compute orchestrator (NCO) application that manages requests for service from requester devices. When a request for service from a requester device is received, the NCO determines (a) a compute grade requirement for the service, and (b) a maximum acceptable latency for the service. For example, VR/AR service may be assigned a high compute grade with latency requirements for fast delivery of data, while opening a browser may be assigned a low compute grade with a latency requirement for relatively slow delivery of data. Compute grade may also vary between different VR/AR experiences, or even within different parts of a single VR/AR experience (e.g., an action-heavy virtual location may be more demanding to render than a virtual location that shows only a simple background).

The NCO reacts to the request by accessing a data structure that stores for each of a network arrangement of network devices (a) number and type of available compute units, and (b) latency to the requester device. In some embodiments, the term "compute unit" may refer to any subset of computation resources (hardware, software or a combination of hardware and software) available on a device or a combination of devices. For example, a "compute unit" may be a fully configured, self-contained hardware-software combine that can run an application program. In context of AR/VR applications a compute unit may be a defined as software, hardware or combination of hardware and software that takes an input controller input and generates as output a rendered image in 3D environment. In context of computer vision application, a compute unit may be defined as software (e.g., a container), hardware (e.g., a core) or combination of hardware and software that takes an input captured video and output instruction to a driving unit of a vehicle. Using this data structure, NCO selects a device from the network arrangement (e.g., a hierarchy) that has an available compute unit meeting the compute grade requirement and having latency lower than the latency requirement determined for the request. The NCO then instructs the selected device to perform the requested service and to deliver the result to the requester device via the network. In this way, computationally intense requests may be routed to the most efficiently located and powerful device or devices in the network arrangement, while requests that are not as computationally intense and have a looser latency requirements can be handled by less powerful devices (or handled by devices farther away with high latency, without threatening more demanding tasks).

BRIEF DESCRIPTION OF THE DRAWINGS

The present disclosure, in accordance with one or more various embodiments, is described in detail with reference to the following figures. The drawings are provided for purposes of illustration only and merely depict typical or illustrative embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 2a shows another illustrative example of a network arrangement for performing remote computation, in accordance with some embodiments of this disclosure;

FIG. 2b shows another illustrative example of a network arrangement for performing remote computation, in accordance with some embodiments of this disclosure;

DETAILED DESCRIPTION

Figure 1:
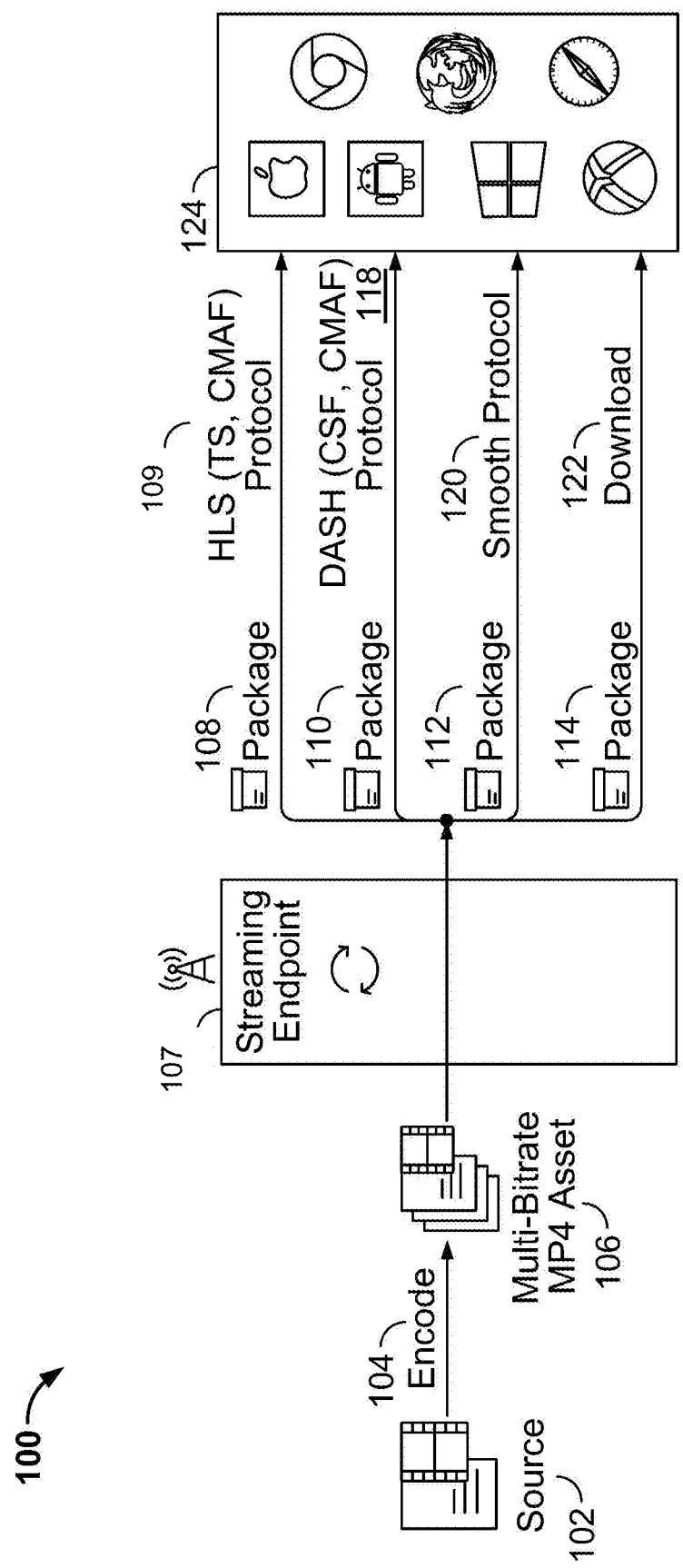
FIG. 1 shows an illustrative example of a network arrangement for performing remote computation, in accordance with some embodiments of this disclosure.

FIG. 1 shows an illustrative example of network arrangement 100 (e.g., a hierarchy) for performing remote computation, in accordance with some embodiments of this disclosure. In the shown example, an original source file for a media asset 102 is encoded (compressed) at various bit rates at a remote server, and stored as a multi-bitrate asset (or stored as chunks of the asset, each of which is multi-bitrate) and is then delivered to a client 124 based on requested parameters as well as network conditions via streaming endpoint 106. If desired, media assets (such as the media asset 102) may be encoded, stored, and delivered at a single bit rate.

Streaming endpoint 107 may deliver packages based on pre-encoded data via several different protocols, including, for example, protocols that facilitate adaptive bitrate streaming (ABR). For example, package 108 may be delivered via HTTP Live Streaming (HLS) Protocol 116. Package 110 may be delivered via Dynamic Adaptive Streaming over HTTP (DASH) 118. Package 112 may be delivered via a smooth protocol 120. Package 114 may be delivered via a download protocol 122. Client 124 can then decode and display the data encoded by the packages. While such protocols are suitable for pre-encoded content, such architecture may struggle to provide data that is not linear (e.g., data that is dependent on user input in AR/VR or video game environments, or data that is dependent on changing environments, such as data for a self-driving vehicle).

FIGS. 2A and 2B show illustrative examples of a network arrangement for performing remote computation, in accordance with some embodiments of this disclosure. In particular, FIGS. 2A and 2B demonstrate architectural differences between delivery of non-interactive media and interactive media.

FIG. 2A shows architecture 200 for delivery of non-interactive media. Media server 201 preemptively performs 202 a transcode operation on media content to generate multi-bit rate assets 204 (e.g., stored at one or more content delivery network (CDN) servers). When client 208 requests an asset (at 209), the media server 201 routes the request to a nearest one of CDN servers storing the asset 204. The CDN server then sends 206 the media asset at an appropriate bit rate to client 208. Client 208 then decodes and displays 210 the asset.

FIG. 2B shows architecture 250 for delivery of interactive media (e.g., AR/VR media or game content). In this case, the media cannot be transcoded or rendered ahead of time. For example, client 208 may request 270 a change in content via a game controller (e.g., to rotate the game world) or via movement of a head-mounted display (e.g., to display another section of a virtual environment). The request may then be routed 251 to the nearest CDN server (e.g., media server 252). Media server 252 then processes 272 the request (e.g., by generating a new game state or a new view of a virtual environment). The generated game state or virtual environment is rendered at step 254, and transcoded at step 274. When the transmission is ready for output 256, such transmission is sent back to the client 258 for display. The process is repeated for each request from the client. As can be seen, architecture 250 is significantly more computationally intensive since the media cannot be pre-transcoded. Furthermore, architecture 250 is subject to more strict latency requirements, and if not managed correctly may result in slow output, degrading AR/VR or gaming application performance. For this reason, more advanced architecture may be used (e.g., as shown in FIG. 4).

Figure 3:
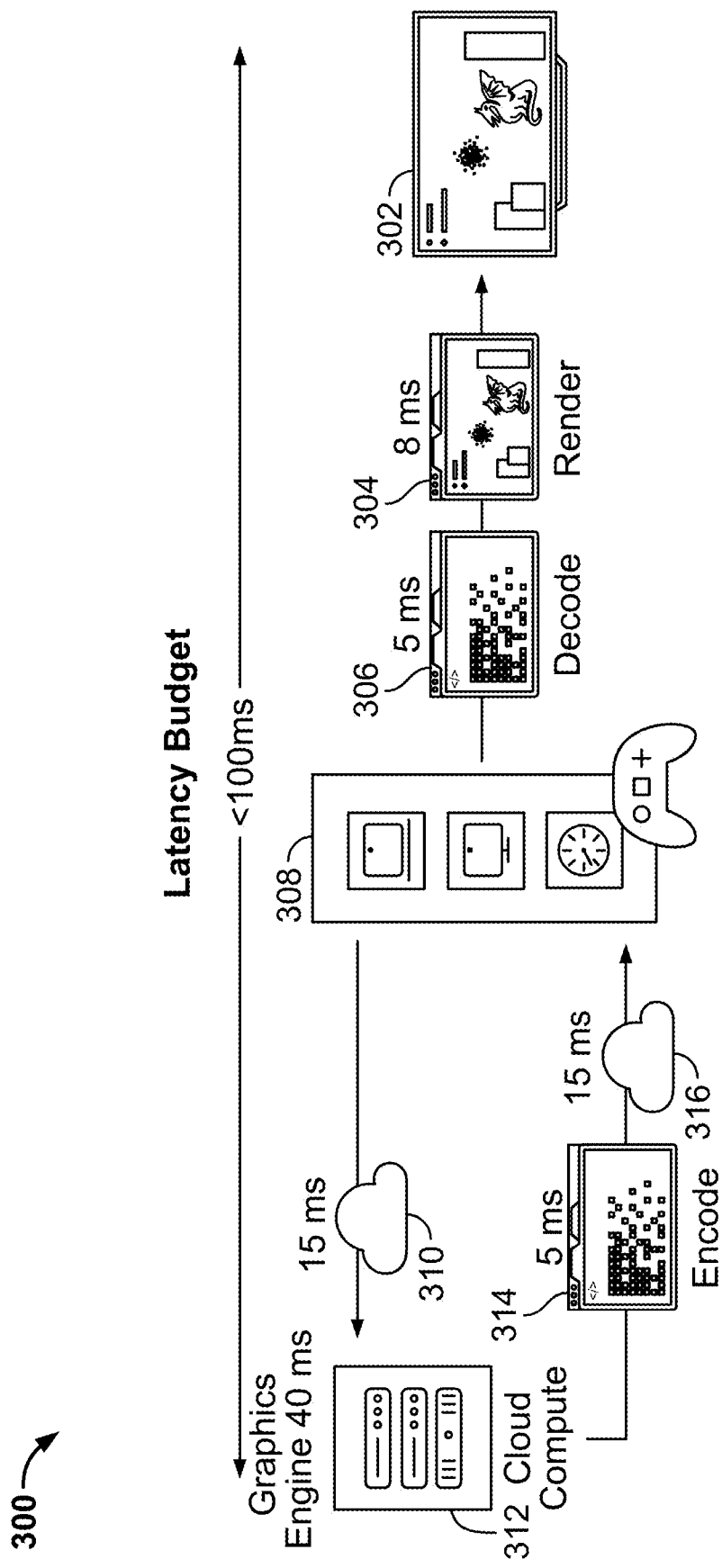
FIG. 3 shows another illustrative example of a network arrangement for performing remote computation, in accordance with some embodiments of this disclosure.

FIG. 3 shows an illustrative example of network arrangement 300, relative to a client, for performing remote computation, in accordance with some embodiments of this disclosure. In an example embodiment, a distinct hierarchy data structure (describing some or all devices in a network arrangement of devices) may be identified for a cluster of requestor devices rather than on a per requester device basis (e.g., geographically clustered, thus having similar expected latency measurements relative to the network devices). That is, hierarchies may be identified on a per cluster basis, wherein each requestor device within a particular cluster uses the same hierarchy. In an embodiment, the clusters may be determined based on additional or alternative factors (e.g., explicit latency measurements, IP addresses or IP address ranges, etc.). As shown, client 302 is requesting service (e.g., for a VR/AR or gaming experience). In one example, the service (e.g., game experiences or VR/AR environment) is served on client 302 at 60 frames per second (fps). This may give the system (e.g., network arrangement 300) 50-100 milliseconds to present a frame back to the user from the time that the user issues his/her input (e.g., via controller 308 or head-mounted display). A delay in display of frames over 100 milliseconds from the moment of request (e.g., button press or head rotation) will generally degrade the application and is considered unacceptable. For example, the latency may be a sum total of time spent for network transmission of the request 310, graphics engine computation 312, encoding of the frame 314, transmission of the encoded frame 316, decoding 306 of the frame, and rendering 304 of the frame before display on client 302, and/or any other suitable factors may also be taken into account.

Different computation requests from client 302 may have different computational intensity requirements and different latency requirements. For example, certain games may be less computationally intense and less latency sensitive (e.g., online chess) than other experiences (e.g., first person multiplayer game). Systems and methods are described below which leverage computationally intensity and latency requirement data to select an optimal device in a network arrangement to perform the required task. In another example, a First-person shooter (FPS) games are an example of a compute intensive game. In another example, a game in which scenes look rich and full of detail, or like real-life (photo-realistic) is an example of highly compute intensive game. In another example, an AR experience which the user moves relatively slowly and interacts with elements in the content infrequently, is "lean back", and the user will tolerate greater "motion to photon" latency for an acceptable experience. In yet another example, "lean forward" VR content with fast action may tolerate a lot let latency.

Figure 4:
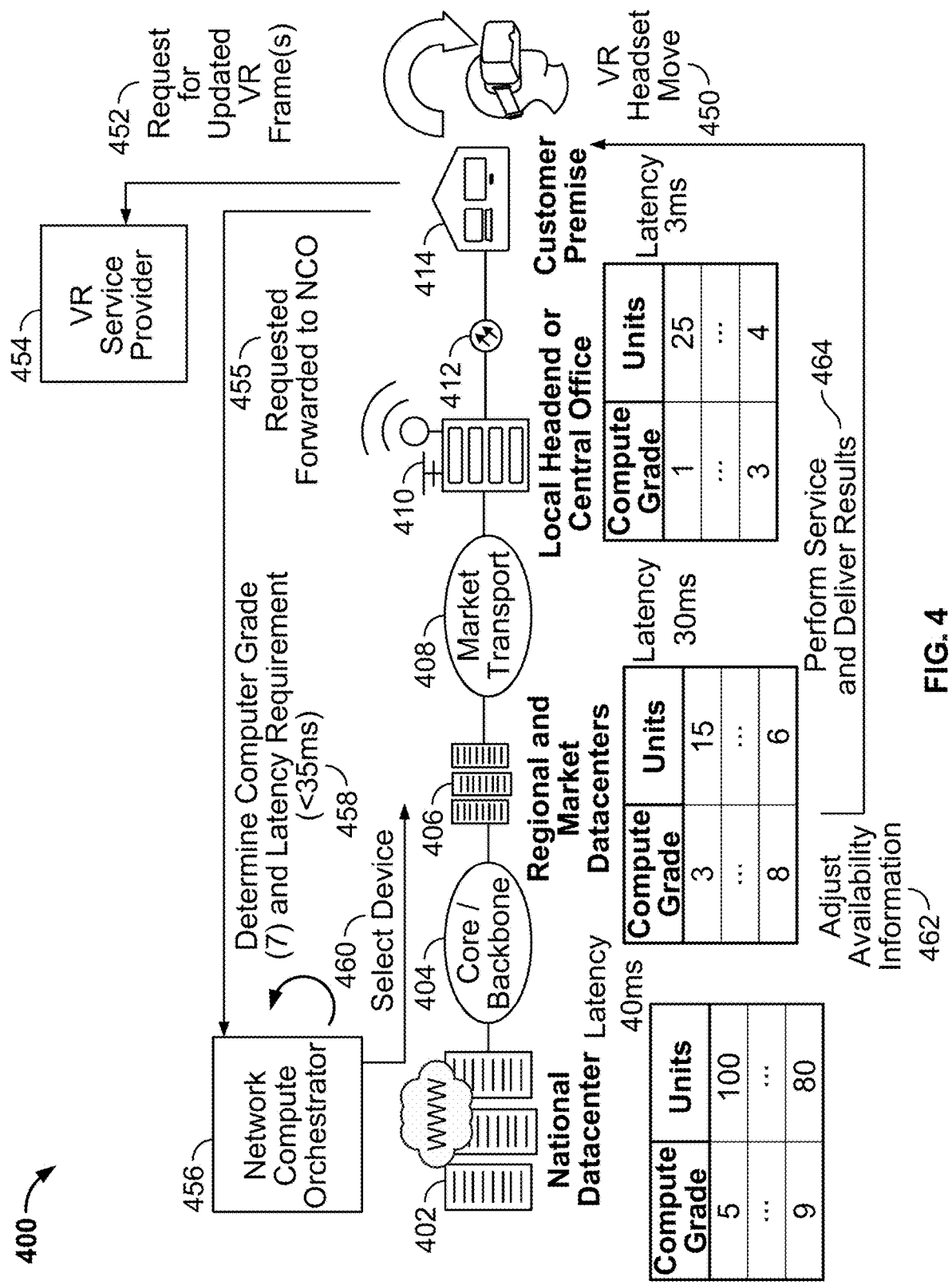
FIG. 4 shows yet another illustrative example of a network arrangement for performing remote computation, in accordance with some embodiments of this disclosure.

FIG. 4 shows an illustrative example of network arrangement 400 (e.g., a hierarchy) for performing remote computation while accounting for computational intensity and latency requirement data, in accordance with some embodiments of this disclosure.

Network arrangement 400 may be arranged with customer equipment 414 (e.g., customer premise or customer mobile equipment) being the lowest level. Customer equipment 414 may be any suitable computing device, a desktop computer, a laptop, a set-top box, a system on a chip, a smartphone, a tablet, a wearable device or a combination of any of the above. Customer equipment 414 may be connected by one or more network links to a service provider (e.g., VR service provider 454) and to several devices in an arrangement of network devices. For example, customer equipment 414 may be connected to local headend 410, regional data center 406 and national data center 402. Connections may be provided via one or more network links 404, 408 and/or other links. Network links may be of any suitable kind, including but not limited to cable, broadband, cellular, or any combination of the above. In some embodiments, the described method of selecting resources by the NCO 456 may be performed between multiple cores of the same computing system, in which cases the cores may be connected by busses instead of network links.

In some embodiments, each successive layer of network arrangement 400 may have more available computational resources but may have large latency due to the need to service a larger number of end user devices. For example, headend 410 may service 100 client devices, a regional data center may service 10,000 client devices and a national datacenter may service 100,000 client devices. However, more remote locations may increase latency. Each of data center 402, regional center 406, and local headend 410 may be a single device or a combination of devices.

The allocation of computer resources may be performed by network compute orchestrator 456 (NCO). NCO 456 may be a software application, hardware device, or a combination of the above suitable for the task of allocating compute resources. For example, NCO 456 may be an application executed at national data center 402. In another embodiment, NCO 456 may be an application executed on a separate device connected to all devices in network arrangement 400. In another embodiment, NCO 456 may be located at one of national data center 402, regional centers 406, local headend 410, or at any combination of the above.

As part of initial set up, each network arrangement 400 may organize its computational resources into identifiable compute units with associated compute grades. For example, as shown in FIG. 4, a system of ranking compute grades from 1 to 10 may be used. However, any other suitable method of ranking computational resources may be used, e.g., ranking 1-100, or ranking based on required number of floating-point operations per second (FLOPS). In one embodiment, each of devices 402, 406, 410, may create a VM (virtual machine) or container (e.g., controlled by a hypervisor such as Kubernetes™) for performing computation tasks over a predefined or variable time period. In some embodiments, compute grades may correspond to a number of available FLOPS. For example, compute grade 10 may correspond to 500 Giga Flops, compute grade 1 may correspond to 50 Giga Flops, and other grades may be evenly spaced between these two values. In another embodiment, compute units may be graded based on availability of random-access memory (RAM) or virtual RAM (vRAM). In yet another embodiment, compute units may be graded based on availability of random-access memory (RAM) or virtual RAM in combination with available FLOPS. In yet another embodiment, compute units may be graded based on combination of hardware of software resources provided by that computer unit (e.g., the number of CPU Cores, availability of a certain GPU with a certain FLOPS and vRAM capability, access to eternal RAM and Secondary Memory of a certain size, the type of Operating System, etc.). In another embodiment, the compute grade may be any suitable function of the number of CPU cores, random access memory, operating system, graphic processing unit, or any combination of the above.

For example, national data center 402 may generate hundreds of virtual machines, each corresponding to a pre-defined compute grade (e.g., 2000 virtual machines capable of grade 5 calculations, 100 virtual machines at grade 9 calculations, etc.). National data center 402 may keep track of how many of such compute grade resources are currently available. For example, as shown in FIG. 4, national data center 402 may determine that 100 units of grade 5 computational resources (e.g., via 100 available virtual machines) and 80 units of grade 9 computational resources, etc., are currently available. Similarly, each of regional center 406 and local headend 410 may maintain its own compute grade availability information (e.g., by use of virtual machines).

NCO 456 may have access to compute availability information from each of devices 402, 406, and 410 in network arrangement 400 (e.g., in a single, periodically updated data structure or in a data structure that is a list of tables). Additionally, NCO 456 may have a list of latency information for communication of data between each of devices 402, 406, and 410 in network arrangement 400 and customer device 414. Latency information may be periodically measured or interpolated. In another embodiment, latency may be estimated by NCO 456 on demand when a request comes in. In another embodiment, customer equipment 414 may periodically ping each of devices 402, 406, and 410 in arrangement 400 and report the computed latency to NCO 456 (e.g., as part of a service request). In another embodiment, NCO 456 may deploy a latency measurement system between several probes at different points in the network hierocracy 400. Some latencies may be directly measured and averaged. Other latencies may be deduced by addition or subtraction of aggregated, measured latencies based on knowledge of the topology of the network. Each measurement may be used to update a previously averaged value using a weighted approach by allotting a higher weight to the most recently received value. In some embodiments, jitter (change in latency over time) may also be measured (by collating latency data over time) and stored along with latency data.

In operation, customer device 414 may establish end-user service from a service provider 454. Service provider 454 may be a stand-alone device or devices, or be located at one of network locations 402, 406, and 410. As shown, customer equipment 414 may include an input device (e.g., keyboard, mouse, touchpad, VR headset, AR headset, game controller etc.) For example, a VR headset may be engaged in VR service from a VR service provider 454. However, any kind of customer equipment and any kind of on-demand remote computational service may be provided. In the shown example, the VR headset moves (at 450), which requires the VR headset to generate a request 452 for a new scene or frame to be provided (e.g., a view of a virtual environment generated by provider 454 from a different angle.)

In some embodiments, VR service provider 454 may offload (at 455) the fulfillment of the request 452 to network arrangement 400 (e.g., due to low available local computation capacity). In this case, the request is forwarded from VR service provider 454 to the NCO 456. For example, VR service provider 454 may have already set up each or some of devices 402, 406, and 410 with required data to perform on-demand VR rendering tasks. In some embodiments, application (e.g., an application executable of application service 454) may have been pre-loaded into memories of each or some of devices 402, 406, and 410 such that their compute units can execute it on demand. For example, vector data for the VR environment may have been pre-loaded into memories of each or some of devices 402, 406, and 410, such that a view from any position or angle can be generated with a simple request containing location and view angle in the virtual environment.

Upon receipt of the request, NCO 456 may determine a compute grade of the request and one or more latency requirements of the request. In one approach, this information may be provided by service provider 454 (e.g., as part of the request). In another embodiment, NCO 456 may maintain a table of requirements for types of services (e.g., as shown in Table 1). The type of service may be extracted by NCO 456 from a header of the request, and the requirements table below may be used to look up required compute grade and latency.

TABLE 1

| Request Type | Compute Grade | Maximum Latency (MS) |
| --- | --- | --- |
| Game X | 2 | 100 |
| VR experience Y | 8 | 90 |
| VR experience Z | 7 | 35 |
| . . . | . . . | . . . |
| Self-Driving Car Environment analyses | 9 | 50 |

In some embodiments, the requirements table may list specific games, VR/AR applications, other suitable computation tasks, along with required compute grades and latencies, and/or any combination thereof. In some embodiments, NCO 456 may update the requirements specified in Table 1 based on historical data. For example, one or more of the network devices may report success or failure of executing a request for VR experience Z at different compute grades, which may be used by NCO 456 to update the table for VR experience Z. For example, if a particular device tried to execute a required computation for VR experience Z at grade 5, and failed, the requirements table may be updated to list required grade 6 for a request listing VR experience Z in the header. In another example, compute grades and latencies may be determined by off-line testing (e.g., by execution and comparison to benchmarks). In another example, compute grades and latencies may be determined using crowdsourcing (e.g., user may be promoted to input what they believe to be the appropriate compute grades and latencies for a certain application). In some embodiments, compute grades and latencies may be provided by a client device or application service. In some embodiments, compute grades and latencies may be cached for later use and/or shares with other systems. In the shown example above, a request specifies VR experience Z, and therefore NCO 456 may determine 458 that compute grade 7 is needed and that a latency of no more than 35 ms is required. In some embodiments, Table 1 may also list acceptable jitter for each request type, and/or any other suitable parameter.

NCO 456 may then access a latency table for the device in network arrangement 400 (e.g., as shown in Table 2). In some embodiments, Table 2 may also list jitter for each device, and/or any other suitable parameter. As shown, the latency and jitter are stored from point of view of end user device.

TABLE 2

| Device | Latency |
| --- | --- |
| Headend | 3 ms |
| Regional Data Center | 30 ms |
| National Data Center | 40 ms |
| . . . | . . . |

NCO 456 may also access a compute availability table (or multiple of such tables) listing available resources for each device in network arrangement 400 (e.g., as shown in Table 3). In some embodiment, any suitable data structure may be used instead of a table (e.g., a tree that defined network arrangement from point of view of the user device). In some embodiments, the order (or entry) in the data structure may defined the distance of the device away from the user in network arrangement (e.g., in the hierarchy).

TABLE 3

| Device ID | Compute Grade | Total Units | Free Units |
| --- | --- | --- | --- |
| Headend | 5 | 100 | 1000 |
| Headend | 9 | 80 | 100 |
| Regional Data Center | 3 | 15 | 50 |
| Regional Data Center | 8 | 6 | 100 |
| National Data Center | 1 | 25 | 50 |
| National Data Center | 3 | 4 | 10 |
| . . . | . . . | . . . | . . . |

The compute availability table may be periodically updated based on information from devices of network arrangement 400. Once NCO 456 accesses the requirements for the request and the most recent version of the table, it may select one or more of the devices in network arrangement 400 to execute the request. In one approach, Tables 1-3 may be considered a single data structure. For example, in the provided example, regional data center 406 is selected because it has an available compute unit 8 (which is higher than required level 7) and has latency of 30 ms to client device 414 which is smaller than stated latency maximum of 35 ms. If multiple devices fit the requirements, NCO 456 may select a device with lowest latency or a device that is closest to customer equipment in the network arrangement 400 (e.g., has the smallest network distance to device 414). In some embodiments, NCO 456 may also check if the device meets the jitter requirement.

After device 406 is selected 460, NCO 456 may cause the device 406 to perform the required service. For example, NCO 456 may issue a command (over a network) to a local compute orchestrator of device 406 to reserve the unit (e.g., a VM instance capable of level 8 computational tasks) and send a cryptographic token to user device 414 or service provider 454. For example, each VM instance may have an associated flag that indicates (e.g., to a hypervisor) if that VM is open to requests. If the flag is set to "open," new tasks can be scheduled for that VM instance by NCO 456. If the flag is set to "closed," the VM instance is reserved and can only be used by an authorized requester (e.g., a requester in possession of an authorization token for that VM instance). NCO 456 may receive a response confirming reservation success and pass an authorization token to service provider 454, which enables service provider 454 to use the computation power of device 406. The application service provider 454 uses this authorization token to claim the compute resource by directly communicating with the local compute orchestrator of device 406, which causes the device 406 to perform the needed task (e.g., rendering of a new VR frame), for example, using the reserved VM instance capable of level 8 computational tasks. Once the computation is complete, device 406 sends (at 464) the result to customer device 414 either directly or via service provider 454.

In some embodiments, the aforementioned aspects may also cause changes 462 in availability data of compute units. For example, the new availability information may list 5 available units of level 8 compute grade instead of 6. This may also cause an update to the availability table maintained at NCO 456 (e.g., to reflect new state of availability of compute units for further requests).

In some embodiments, the request 455 may list a request for more than one compute unit. For example, the request may ask for one compute unit of grade 8 and one compute unit of grade 1 (both at a latency maximum of 35 ms). In this case, the NCO 456 may check if both requests can be fulfilled by one or different devices in network arrangement 400. In this example, NCO 456 may select device 406 to perform the part of computation at grade 8 and select headend 410 to perform the task at grade 5, since they have available units and meet the latency maximum requirement. Availability tables for both devices may then be updated. If either one of the requests cannot be fulfilled, the NCO 456 may send a failure notification to device 414. In some embodiments, user device 414 may be assigned as having its own compute units (e.g., user device 414 may signal local availability of compute units to the NCO). In this case, Table 1 may also list user device 414 as a device of network arrangement of devices that may be allocated compute tasks in other single computer unit request or in split compute unit request. For example, if some compute demand may be met by the user devices, NCO 456 may only seek other compute units from other devices for the remainder of the compute demand.

NCO 456 may repeat the steps described above in connection with FIG. 4 for other requests from device 414 and/or from other user devices.

Figure 5:
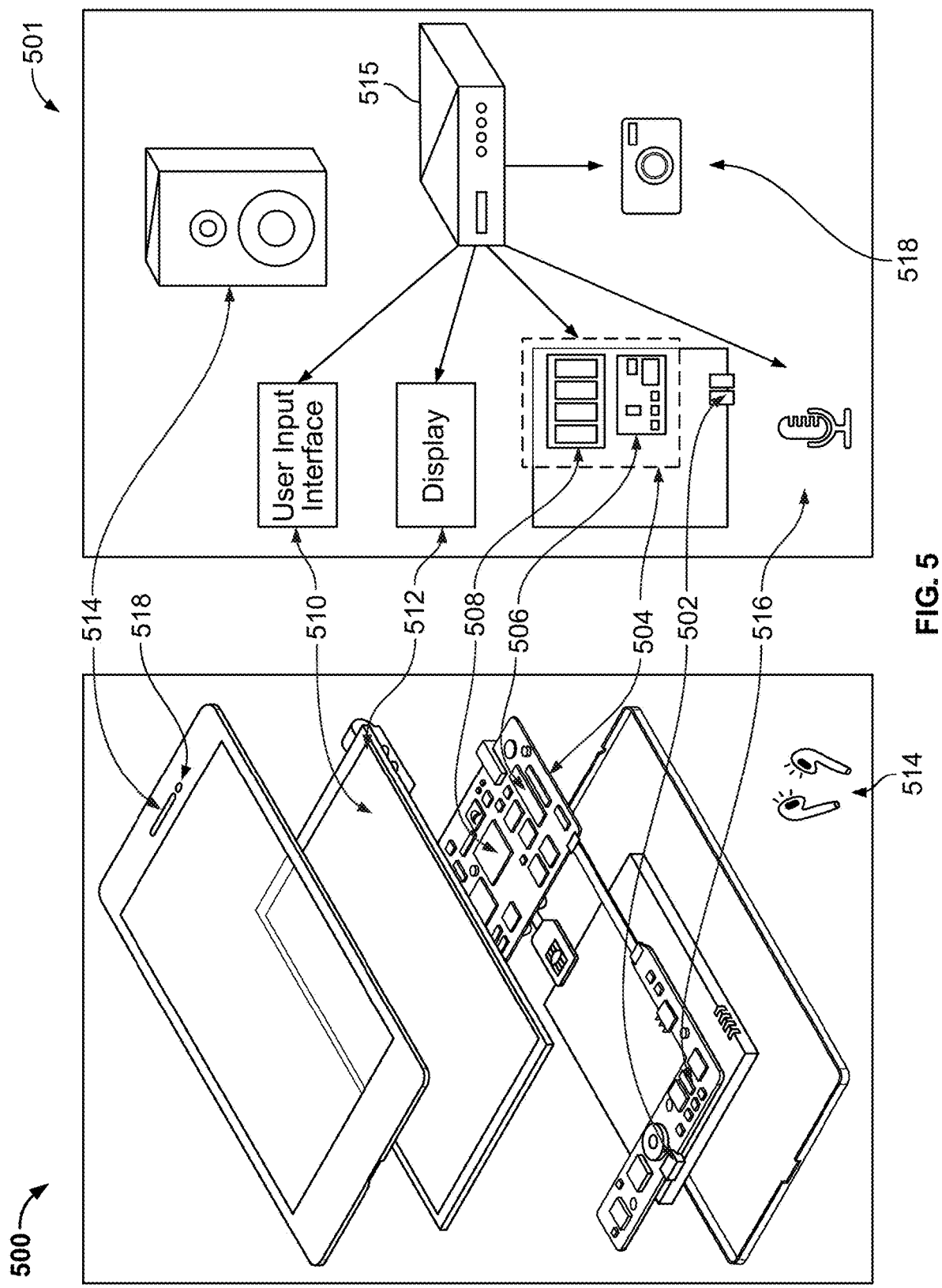
FIG. 5 shows an illustrative user equipment device, in accordance with some embodiments of this disclosure.
Figure 6:
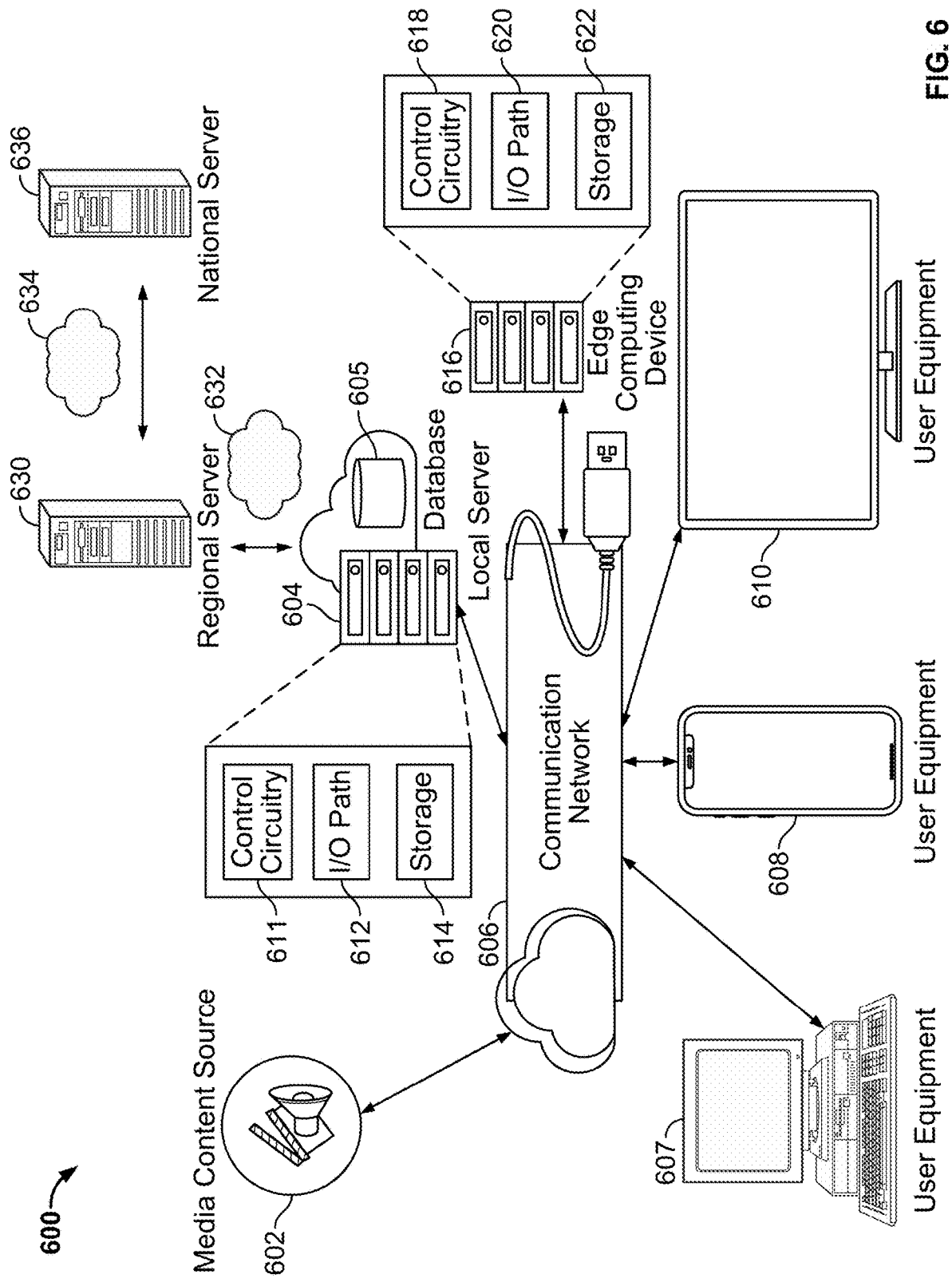
FIG. 6 shows an illustrative system, in accordance with some embodiments of this disclosure.

FIGS. 5-6 depict illustrative devices, systems, servers, and related hardware for allocating computational tasks in a network arrangement (e.g., a hierarchy). FIG. 5 shows generalized embodiments of illustrative user equipment devices 500 and 501, which may correspond to, e.g., computing device 414. For example, user equipment device 500 may be a smartphone device, a tablet, a virtual reality or augmented reality device, or any other suitable device capable of processing video data. In another example, user equipment device 501 may be a user television equipment system or device. User television equipment device 501 may include set-top box 515. Set-top box 515 may be communicatively connected to microphone 516, audio output equipment (e.g., speaker or headphones 514), and display 512. In some embodiments, display 512 may be a television display or a computer display. In some embodiments, set-top box 515 may be communicatively connected to user input interface 510. In some embodiments, user input interface 510 may be a remote-control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 500 and user equipment device 501 may receive content and data via input/output (I/O) path (e.g., circuitry) 502. I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 6 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the NCO application stored in memory (e.g., storage 508). Specifically, control circuitry 504 may be instructed by the NCO application to perform the functions discussed above and below. In some implementations, processing or actions performed by control circuitry 504 may be based on instructions received from the NCO application.

In client/server-based embodiments, control circuitry 504 may include communications circuitry suitable for communicating with a server or other networks or servers. The NCO application may be a stand-alone application implemented on a device or a server. The NCO application may be implemented as software or a set of executable instructions. The instructions for performing any of the embodiments discussed herein of the NCO application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a device 500.

In some embodiments, the NCO application may be a client/server application where only the client application resides on device 500 (e.g., device 104), and a server application resides on an external server (e.g., server 604 and/or server 616). For example, the NCO application may be implemented partially as a client application on control circuitry 504 of device 500 and partially on server 604 as a server application running on control circuitry 611. Server 604 may be a part of a local area network with one or more of devices 500 or may be part of a cloud computing environment accessed via the internet. In a cloud computing environment, various types of computing services for performing searches on the internet or informational databases, providing encoding/decoding capabilities, providing storage (e.g., for a database) or parsing data (e.g., using machine learning algorithms described above and below) are provided by a collection of network-accessible computing and storage resources (e.g., server 604 and/or edge computing device 616), referred to as "the cloud." Device 600 may be a cloud client that relies on the cloud computing capabilities from server 604 to determine whether processing (e.g., at least a portion of virtual background processing and/or at least a portion of other processing tasks) should be offloaded from the mobile device, and facilitate such offloading. When executed by control circuitry of server 604 or 616, the NCO application may instruct control circuitry 611 and/or control circuitry 618 to perform processing tasks for the client device and facilitate the NCO operations.

In some embodiments, NCO application may reside at any device in certain network arrangement (e.g., a hierarchy) of devices. For example, the hierarchy may include a regional server 630, and national server 636 connected via networks links 634 and 632.

Control circuitry 504 may include communications circuitry suitable for communicating with a server, edge computing systems and devices, a table or database server, or other networks or servers. The instructions for carrying out the above-mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as NCO application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive video encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, movement detector or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and equipment 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. Camera 518 may be an analog camera that converts to digital images via a video card.

The NCO application may be implemented using any suitable architecture. For example, it may be a stand-alone application wholly-implemented on each one of user equipment device 500 and user equipment device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide encoding/decoding functionality and preform any of the actions discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the NCO application is a client/server-based application. Data for use by a thick or thin client implemented on each one of user equipment device 500 and user equipment device 501 may be retrieved on-demand by issuing requests to a server remote to each one of user equipment device 500 and user equipment device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

In some embodiments, the NCO application may be downloaded and interpreted or otherwise run by an interpreter or virtual machine (run by control circuitry 504). In some embodiments, the NCO application may be encoded in the ETV Binary Interchange Format (EBIF), received by control circuitry 504 as part of a suitable feed, and interpreted by a user agent running on control circuitry 504. For example, the NCO application may be an EBIF application. In some embodiments, the NCO application may be defined by a series of JAVA-based files that are received and run by a local virtual machine or other suitable middleware executed by control circuitry 504. In some of such embodiments (e.g., those employing MPEG-2 or other digital media encoding schemes), NCO application may be, for example, encoded and transmitted in an MPEG-2 object carousel with the MPEG audio and video packets of a program.

FIG. 6 is a diagram of an illustrative system 600 for encoding/decoding, in accordance with some embodiments of this disclosure. User equipment devices 607, 608, 610 (e.g., which may correspond to one or more of computing device 212 may be coupled to communication network 606). Communication network 606 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 606.

System 600 may comprise media content source 602, one or more servers 604, and one or more edge computing devices 616 (e.g., included as part of an edge computing system, such as, for example, managed by mobile operator 206). In some embodiments, the NCO application may be executed at one or more of control circuitry 611 of server 604 (and/or control circuitry of user equipment devices 607, 608, 610 and/or control circuitry 618 of edge computing device 616). In some embodiments, the data structure(s) described above and below may be stored at database 605 maintained at or otherwise associated with server 604, and/or at storage 622 and/or at storage of one or more of user equipment devices 607, 608, 610.

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 612 may provide encoding/decoding data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 614 that is part of control circuitry 611.

Edge computing device 616 may comprise control circuitry 618, I/O path 620 and storage 622, which may be implemented in a similar manner as control circuitry 611, I/O path 612 and storage 624, respectively of server 604. Edge computing device 616 may be configured to be in communication with one or more of user equipment devices 607, 608, 610 and video server 604 over communication network 606, and may be configured to perform processing tasks (e.g., encoding/decoding) in connection with ongoing processing of video data. In some embodiments, a plurality of edge computing devices 616 may be strategically located at various geographic locations, and may be mobile edge computing devices configured to provide processing support for mobile devices at various geographical regions.

Figure 7:
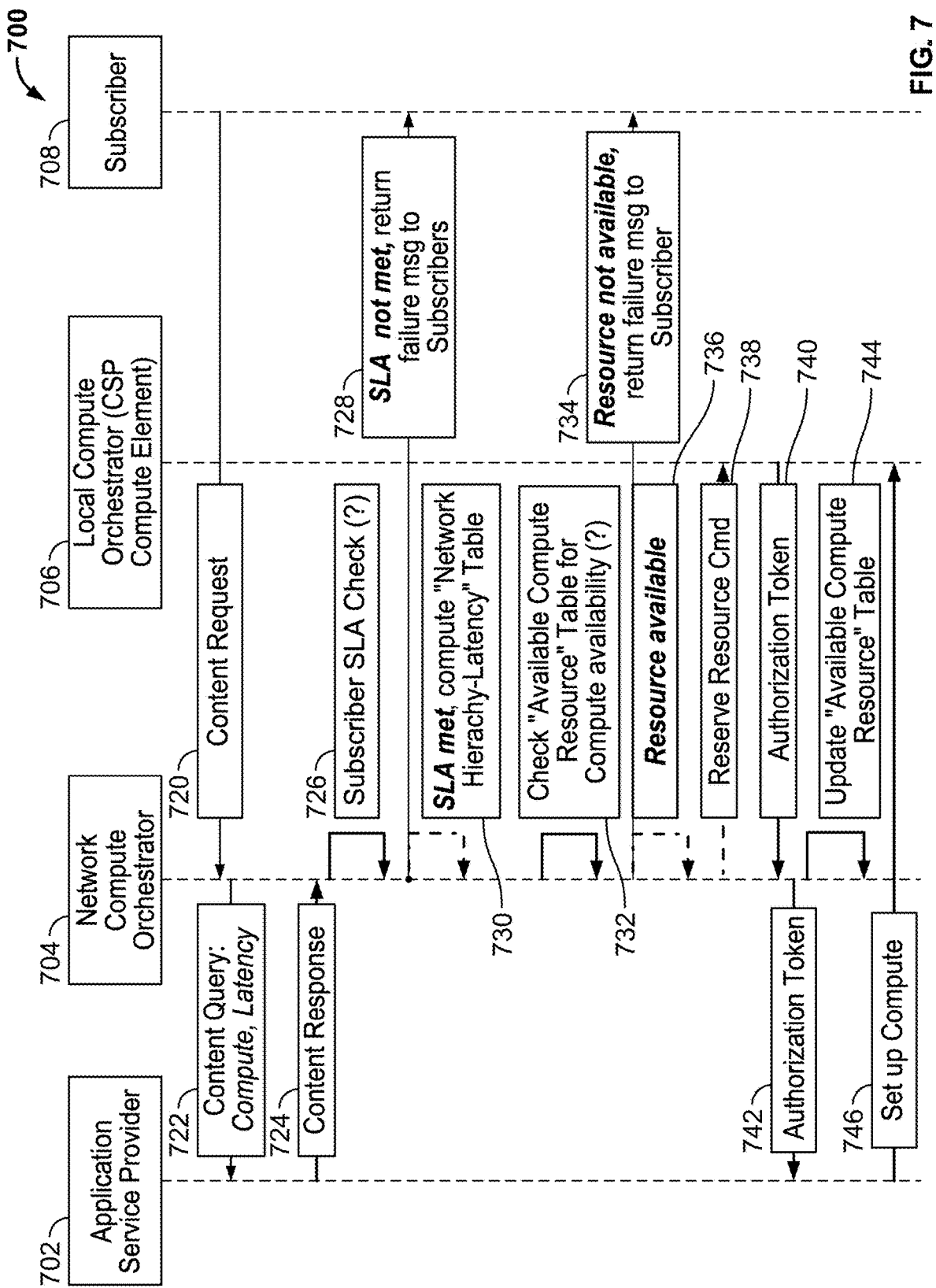
FIG. 7 is a flowchart of a detailed illustrative process for allocating computational tasks in a network arrangement, in accordance with some embodiments of this disclosure.

FIG. 7 is a flowchart of a detailed illustrative process 700 for allocating computational tasks in a network arrangement (e.g., hierarchy), in accordance with some embodiments of this disclosure. In various embodiments, the individual steps of process 700 may be implemented by one or more components of the devices and systems of FIGS. 4-6. Although the present disclosure may describe certain steps of process 700 (and of other processes described herein) as being implemented by certain components of the devices and systems of FIGS. 4-6, this is for purposes of illustration only, and it should be understood that other components of the devices and systems of FIGS. 4-6 may implement those steps instead.

For example, the steps of process 700 may be implemented by one or more of control circuitries of application service provider 702 (e.g., service provider 454), NCO 704 (e.g., NCO 456), local orchestrator 706 (e.g., at device 406), and subscriber device 708 (e.g., device 414).

At step 720, control circuitry of subscriber device 708 transmits a content request to NCO 704 (e.g., via application service provider 702). At step 722, NCO 704 queries the application service provider 702 for compute grade and maximum allowable latency for service of the request. In some embodiments, NCO 704 may determine this information using local resources (e.g., as shown in Table 1 above). Alternatively, at step 724 this data is provided by the application service provider 702.

At step 726, NCO 704 may perform a service level agreement (SLA) check to determine if computation resources of local orchestrator 706 may be provided. If not, a failure message is sent 728 to subscriber device 708. If the SLA is met, process 700 continues at step 730, where NCO 704 accesses the latency table (e.g., Table 2 above) to identify a subset of devices with low enough latency to subscriber device 708 that are eligible to fulfill the compute request sent at step 720. At step 732, NCO 704 accesses the availability table (e.g., Table 3 above) to identify a subset of devices with free compute units at the required compute grade of the service identified by the request. If no devices meet the requirements of both steps 730 and 732, a failure message is sent to subscriber device 708 at step 734.

If local orchestrator 706 is identified 736 at device checks of steps 730 and 732, NCO 704 sends a reservation command to local orchestrator 706 at step 738 which, for example, causes local orchestrator 706 to keep one of its VMs at the required grade, available for a pre-set time period. At step 740, local orchestrator 706 may send an authorization token (e.g., a unique cryptographic key) to NCO 704 that is needed to request computation resources from local orchestrator 706. NCO 704 may forward the token to application service provider 702 at step 742. NCO may also update 744 the availability table (e.g., Table 3 above) to indicate that local orchestrator 706 has one less compute unit available at the grade of the service identified by the request.

At step 746, application service provider 702 may use the token to set up computation with the local orchestrator 706 (e.g., by providing the token and the data needed to fulfill the request). Local orchestrator 706 may then fulfill the request (e.g., using a VM of a reserved compute grade) and send the results to subscriber device 708 (e.g., directly or via application service provider 702).

Figure 8:
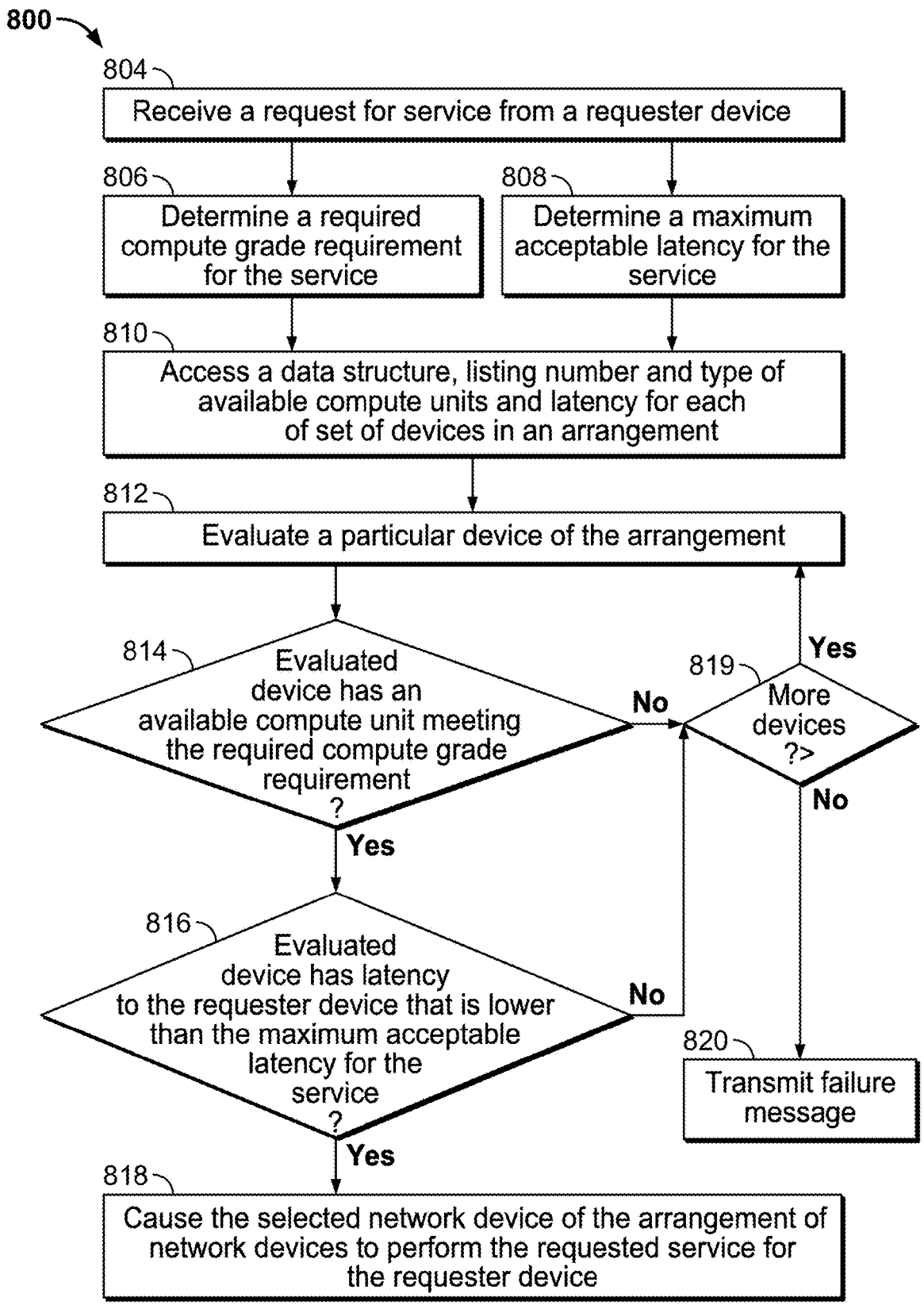
FIG. 8 is another flowchart of a detailed illustrative process for allocating computational tasks in a network arrangement, in accordance with some embodiments of this disclosure.

FIG. 8 is a flowchart 800 of a detailed illustrative process 800 for allocating computational tasks in network arrangement (e.g., a hierarchy), in accordance with some embodiments of this disclosure. In various embodiments, the individual steps of process 800 may be implemented by one or more components of the devices and systems of FIGS. 4-6. Although the present disclosure may describe certain steps of process 800 (and of other processes described herein) as being implemented by certain components of the devices and systems of FIGS. 4-6, this is for purposes of illustration only, and it should be understood that other components of the devices and systems of FIGS. 4-6 may implement those steps instead.

At step 804, a control circuitry (e.g., control circuitry of a computing device at a national data center 402 of FIG. 4) receives a request for services. In some embodiments, the request may be received from any kind of a user device and may request any suitable kind of computation task. In one example, the request may be caused by a game controller for a new game state. In another example, the request may be caused by movement of a VR headset for a new frame of virtual encoder. In another example, the request may be caused by a self-driving vehicle requesting visual analyses (e.g., identification of objects) in a physical environment through which the vehicle is travelling.

Steps 806 and 808 may be performed in any order or in parallel. At step 806, the control circuitry determines a compute grade requirement for the compute service. In some embodiments, this determination may be based on a lookup table that lists the compute grade requirement for different types of services that may be identified by the request (e.g., as shown in Table 1). In some embodiments, this determination may be based on historical data for execution of similar tasks. For example, the compute grade requirement may be expressed as a numerical grade (e.g., 1-10). In another example, the compute grade requirement may be expressed as a required number of FLOPS over a predetermined time period.

At step 808, the control circuitry determines a maximum acceptable latency for the service. For example, the maximum acceptable latency may be specified by the request, looked up in a table, or estimated based on historical data (e.g., based on history of service commonly being terminated by user devices when latency exceeded certain threshold).

At 810, the control circuitry accesses one or more data structures, listing number and type of available compute units and latency for each device in a ascertain network arrangement (e.g., a hierarchy). The data may be received from each device in the hierarchy (e.g., network hierarchy 400 of FIG. 4) and from the user device (e.g., collated as Tables 2 and 3 above). The control circuitry may then use the accessed data to select a network device or devices to perform the service.

At step 812, the control circuitry begins evaluating each device in the arrangement. For example, the control circuitry may begin the evaluation using the lowest-level device in the hierarchy (e.g., a device separated by the least number of network links from the requester client device). Steps 814 and 816 may be performed in any order or at the same time. At step 814, the control circuitry checks if an evaluated device has an available compute unit meeting the requirements. If not, the process 800 returns to 812 to evaluate a next device in the hierarchy (e.g., a device one more step away from the requester device), if there is a next device to evaluate (as checked first in step 819). At step 814, the control circuitry checks if an evaluated device has latency to the requester device that is lower than maximum allowed latency. If not, the process 800 returns to 812 to evaluate a next device in the hierarchy (e.g., a device one more step in network links away from the requester device) if, at 819, it is determined that there is a next device to evaluate.

If no more devices are available when the check is performed at step 819, than the control circuitry sends a notice to client device that the service cannot be performed, and the service is prevented from being performed.

If the checks at step 816 and 814 succeed, process 800 continues at 818, where the selected device is caused to perform the requested service for the requester device. For example, a service provider may receive a cryptographic token that is usable to request service from the selected device. In some embodiments, in addition to checks at steps 814 and 816, the control circuitry may also check if each device meets a jitter requirement (e.g., as specified in a request received at step 804).

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, by a network compute orchestrator (NCO), a request for service from a requester device;
   determining, by the NCO, that the service requested by the requester device is a first type of service of a plurality of service types;
   accessing, by the NCO, a first data structure that stores for each service type of the plurality of service types:
   (a) a compute grade required for a respective service type of the plurality service types, and
   (b) a maximum acceptable latency for the respective service type of the plurality of service types;
   determining, by the NCO, according to the accessing of the first data structure:
   (a) a required compute grade requirement for the first type of service, and
   (b) a maximum acceptable latency for the first type of service;
   accessing, by the NCO, a second data structure that stores for each network device of a network arrangement of network devices:
   (a) a number and a type of available compute units, and
   (b) an estimated or measured latency of communication from the respective network device of the network arrangement of network devices to the requester device;

selecting, by the NCO, a selected network device of the network arrangement of network devices, based at least in part on determining that the second data structure indicates that:
  (a) the selected network device has an available compute unit meeting the required compute grade requirement for the first type of service, and
  (b) the selected network device has the estimated or measured latency of communication from the respective network device of the network arrangement of network devices to the requester device that is lower than the maximum acceptable latency for the first type of service; and
causing the selected network device of the network arrangement of network devices to perform the requested service for the requester device.

2. The method of claim 1, wherein determining the required compute grade requirement comprises:
calculating how many floating-point operations per second (FLOPS) are required for the first type of service; and
assigning a compute grade based on the calculated number of FLOPS.

3. The method of claim 2, wherein calculating how many FLOPS are required for the first type of service comprises looking up data for past execution of tasks of the identified type of service.

4. The method of claim 1, wherein the selecting the selected network device comprises selecting a network device of the network arrangement of network devices that:
  (a) has an available compute unit meeting the required compute grade requirement, and
  (b) has the lowest latency to the requester device.

5. The method of claim 1, wherein causing the selected network device to perform the requested service comprises:
reserving an available compute unit of the selected network device meeting the required compute grade requirement.

6. The method of claim 1, further comprising:
updating the data structure to reduce an indication of compute units available at the selected network device.

7. The method of claim 1, wherein the network arrangement of network devices comprises a plurality of network devices connected via a plurality of network links to the requester device.

8. The method of claim 7, wherein the plurality of network devices comprises:
a first network device connected to the requester device via a first plurality of network links; and
a second network device connected to the requester device via a second plurality of network links larger than the first plurality of network links, wherein the second network device comprises higher compute capacity than the first network device.

9. The method of claim 1, wherein the request for service is a request for one of an augmented reality (AR) rendering or virtual reality (VR) rendering.

10. The method of claim 1, wherein the request for service is a request for processing video data captured by a self-driving vehicle.

11. The method of claim 1, further comprising:
receiving a second request for service from the requester device that defines two required compute grade requirement for the service; and
selecting, by the NCO, two network device of the network arrangement of network devices based on the second request.

12. The method of claim 1, further comprising:
dynamically updating, based on events associated with the first type of service, the compute grade required for the first service type.

13. The method of claim 1, further comprising:
updating, based on failure events associated with the first type of service, the compute grade required for the first service type, and the maximum acceptable latency for the first service type.

14. The method of claim 1, wherein the first service type is an augmented reality (AR) service and the user equipment is a virtual reality (VR) device, wherein the maximum acceptable latency is set according to a movement speed of the VR device.

15. A system comprising:
an input/output circuitry of a network compute orchestrator (NCO) configured to:
  receive a request for service from a requester device;
a control circuitry of the NCO configured to:
  determine that the service requested by the requester device is a first type of service of a plurality of service types;
  access a first data structure that stores for each service type of the plurality of service types:
    (a) a compute grade required for a respective service type of the plurality service types, and
    (b) a maximum acceptable latency for the respective service type of the plurality of service types;
  determine, according to the accessing of the first data structure:
    (a) a required compute grade requirement for the first type of service, and
    (b) a maximum acceptable latency for the first type of service;
  access a second data structure that stores for each network device of a network arrangement of network devices: (a) a number and a type of available compute units, and (b) an estimated or measured latency of communication from the respective network device of the network arrangement of network devices to the requester device; and
  select a selected network device of the network arrangement of network devices, based at least in part on determining that the second data structure indicates that:
    (a) the selected network device has an available compute unit meeting the required compute grade requirement for the first type of service, and
    (b) the selected network device has the estimated or measured latency of communication from the respective network device of the network arrangement of network devices to the requester device that is lower than the maximum acceptable latency for the first type of service; and
wherein the input/output circuitry is configured to:
  cause the selected network device of the network arrangement of network devices to perform the requested service for the requester device.

16. The system of claim 15, wherein the control circuitry is configured to determine the required compute grade requirement by:
calculating how many floating-point operations per second (FLOPS) are required for the first type of service; and
assigning a compute grade based on the calculated number of FLOPS.

17. The system of claim 16, wherein the control circuitry is configured to calculate how many FLOPS are required for the first type of service by looking up data for past execution of tasks of the identified type of service.

18. The system of claim 15, wherein the control circuitry is configured to select the selected network device by selecting a network device of the network arrangement of network devices that:
(a) has an available compute unit meeting the required compute grade requirement, and
(b) has the lowest latency to the requester device.

19. The system of claim 15, wherein the control circuitry is configured to cause the selected network device to perform the requested service by:
reserving an available compute unit of the selected network device meeting the required compute grade requirement.

20. A system comprising:
memory means;
means for receiving, by a network compute orchestrator (NCO), a request for service from a requester device;
means for determining, by the NCO, that the service requested by the requester device is a first type of service of a plurality of service types:
means for accessing, by the NCO, a first data structure in the memory means that stores for each service type of the plurality of service types:
(a) a compute grade required for a respective service type of the plurality service types, and
(b) a maximum acceptable latency for the respective service type of the plurality of service types;
means for determining, by the NCO, according to the accessing of the first data structure:
(a) a required compute grade requirement for the first type of service, and
(b) a maximum acceptable latency for the first type of service;
means for accessing, by the NCO, a second data structure that stores for each network device of a network arrangement of network devices: (a) a number and a type of available compute units, and (b) an estimated or measured latency of communication from the respective network device of the network arrangement of network devices to the requester device;
means for selecting, by the NCO, a selected network device of the network arrangement of network devices, based at least in part on determining that the second data structure indicates that:
(a) the selected network device has an available compute unit meeting the required compute grade requirement for the first type of service, and
(b) the selected network device has the estimated or measured latency of communication from the respective network device of the network arrangement of network devices to the requester device that is lower than the maximum acceptable latency for the first type of service; and
means for causing the selected network device of the network arrangement of network devices to perform the requested service for the requester device.

* * * * *